(12) United States Patent
Gee, II et al.

(10) Patent No.: US 9,461,282 B2
(45) Date of Patent: Oct. 4, 2016

(54) REMOVABLE BATTERY PACK WITH LATCHING MECHANISM

(71) Applicant: Techtronic Floor Care Technology Limited, Tortola (VG)

(72) Inventors: Jack W. Gee, II, Willoughby, OH (US); Mark Butts, Akron, OH (US); Jamie Horvath, Twinsburg, OH (US); Douglas M. Rukavina, Massillon, OH (US)

(73) Assignee: Techtronic Floor Care Technology Limited, Tortola (VG)

( * ) Notice: Subject to any disclaimer, the term of this patent is extended or adjusted under 35 U.S.C. 154(b) by 0 days.

(21) Appl. No.: 14/644,376

(22) Filed: Mar. 11, 2015

(65) Prior Publication Data

US 2015/0188102 A1    Jul. 2, 2015

Related U.S. Application Data

(63) Continuation of application No. 12/405,033, filed on Mar. 16, 2009.

(60) Provisional application No. 61/036,720, filed on Mar. 14, 2008.

(51) Int. Cl.
*H01M 2/10* (2006.01)
*A47L 9/28* (2006.01)

(52) U.S. Cl.
CPC .......... *H01M 2/1022* (2013.01); *A47L 9/2873* (2013.01); *A47L 9/2884* (2013.01); *H01M 2/1066* (2013.01); *H01M 2220/30* (2013.01)

(58) Field of Classification Search
None
See application file for complete search history.

(56) References Cited

U.S. PATENT DOCUMENTS

| | | | |
|---|---|---|---|
| 4,632,201 A | 12/1986 | Kay | |
| 5,004,276 A | 4/1991 | Hanley | |
| 5,535,437 A | 7/1996 | Karl et al. | |
| 5,716,730 A * | 2/1998 | Deguchi | H01M 2/1022 429/123 |
| 5,899,763 A | 5/1999 | Kajiura | |
| 6,181,032 B1 | 1/2001 | Marshall et al. | |
| 6,216,195 B1 * | 4/2001 | Lee | G06F 1/1632 361/679.41 |

(Continued)

FOREIGN PATENT DOCUMENTS

| | | |
|---|---|---|
| DE | 102005010124 | 10/2006 |
| JP | H05192270 | 8/1993 |
| TW | M325658 | 1/2008 |

OTHER PUBLICATIONS

European Search Report for Application No. 1519585.91 dated Feb. 17, 2016 (7 pages).

*Primary Examiner* — Alix Eggerding
(74) *Attorney, Agent, or Firm* — Michael Best & Friedrich LLP

(57) ABSTRACT

A battery pack configured to supply power to a cleaning system and be received by a battery receptacle of the cleaning system. The battery pack includes a housing including an aperture, a user contact moveable between a first position and a second position, a moveable member that moves from a retracted position to a protruded position when the user contact moves from the first position to the second position, and an engagement member that moves from a latched position to an unlatched position when the moveable member moves from the retracted position toward the protruded position. A portion of the moveable member extends through the aperture of the housing when the moveable member is in the protruded position to eject the battery back from the battery receptacle.

18 Claims, 11 Drawing Sheets

(56) References Cited

U.S. PATENT DOCUMENTS

| | | |
|---|---|---|
| 2002/0011819 A1 | 1/2002 | Watson et al. |
| 2004/0070367 A1 | 4/2004 | Schadoffsky et al. |
| 2006/0091858 A1* | 5/2006 | Johnson .................. B25F 5/00 320/128 |
| 2007/0243458 A1 | 10/2007 | Roehm et al. |
| 2008/0250570 A1 | 10/2008 | Dayton et al. |

* cited by examiner

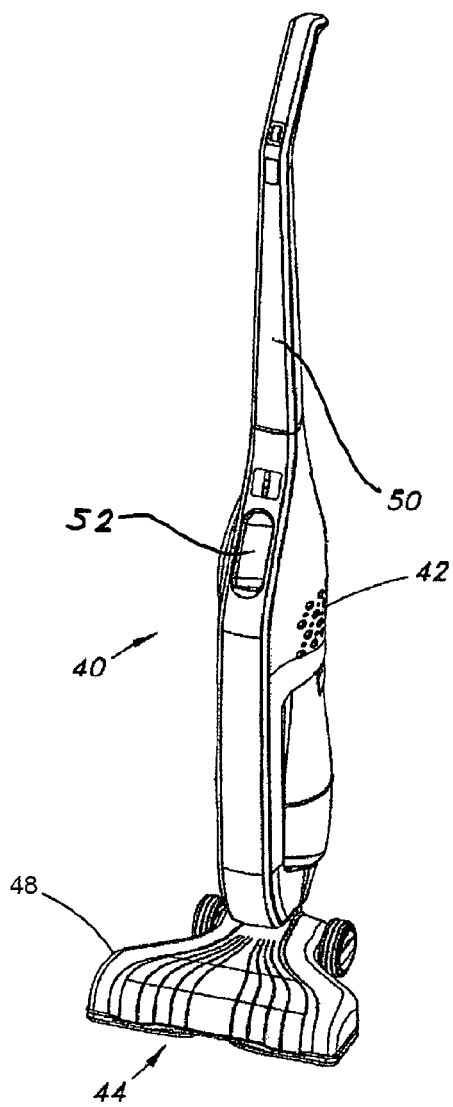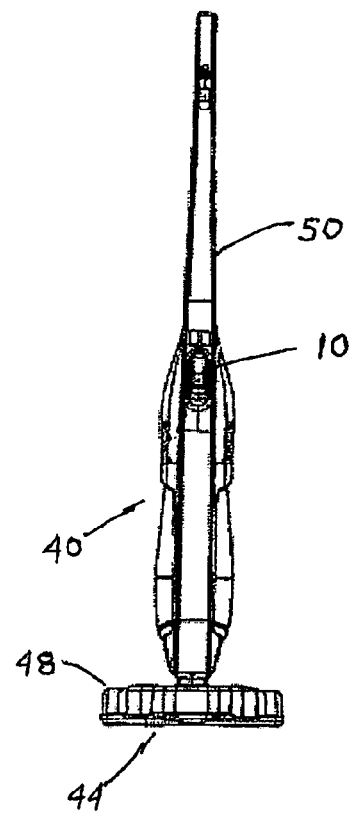
FIG. 3A
FIG. 3B

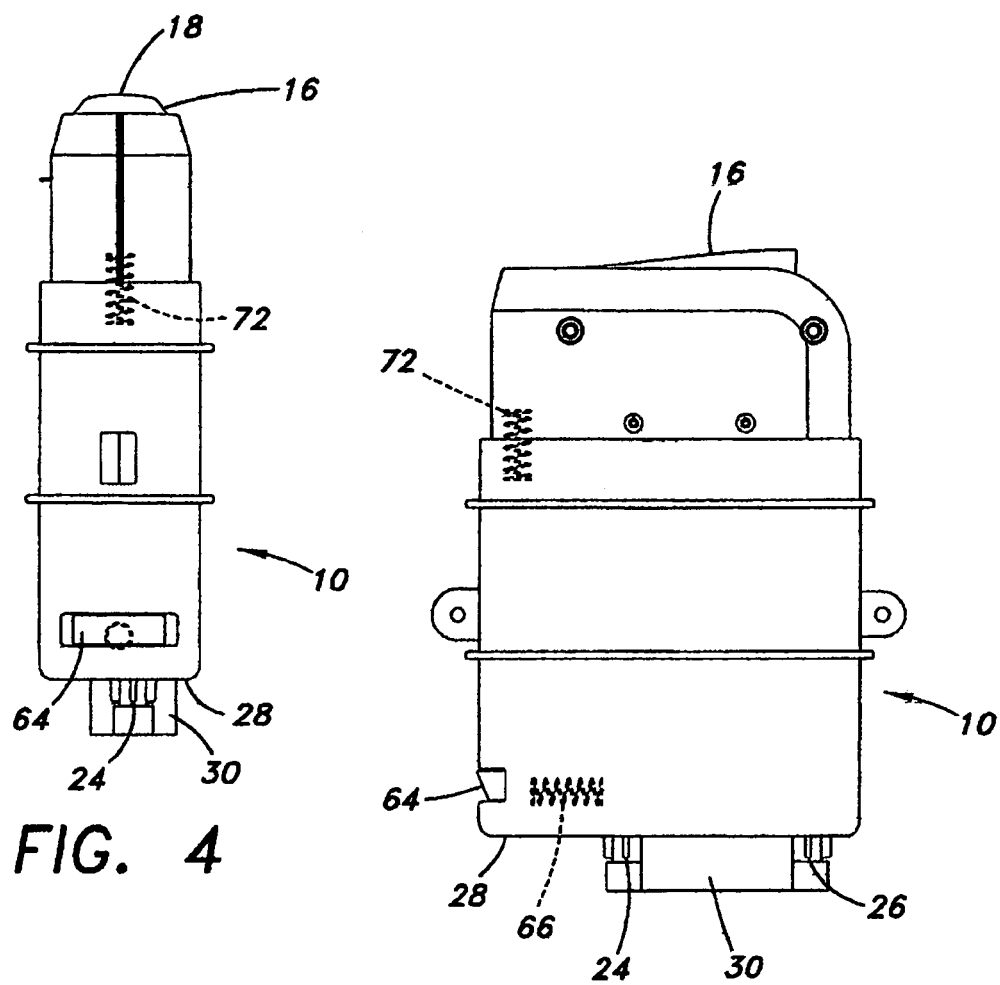
FIG. 4
FIG. 5
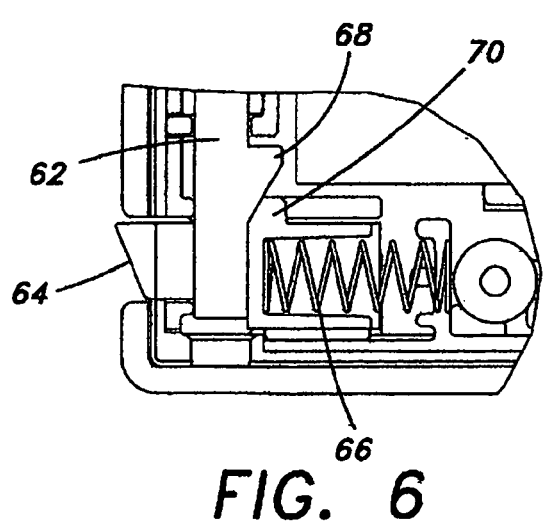
FIG. 6

REMOVABLE BATTERY PACK WITH LATCHING MECHANISM

RELATED APPLICATIONS

This application is a continuation of U.S. patent application Ser. No. 12/405,033 filed on Mar. 16, 2009, which claims priority to U.S. Provisional Application No. 61/036,720, filed on Mar. 26, 2008, both of which are incorporated herein by reference.

BACKGROUND

The present disclosure generally relates to removable battery packs, and more particularly to a removable battery pack having an improved latching mechanism. In particular to one embodiment, a battery pack having an improved latching mechanism is removably disposed in a cleaning appliance with a suction motor impeller assembly (e.g., a stick-type or hand held portable type vacuum cleaner) for powering same. Though the present disclosure will describe a removable battery pack particularly in association with a suction force cleaner, it is to be appreciated that the subject matter described herein has broader applications and may be advantageously employed in related environments and applications (e.g., for use in other powered devices including power tools, radios, power sprayers and the like).

TECHNICAL CONSIDERATIONS

Removable battery packs have been provided in a wide variety of configurations for use with an infinite number of consumer products. As might be expected, there are many different types of battery latching mechanisms for securing removable battery packs to their respective electric powered devices. At least some of these are claimed to allow for easy removal and installation of the battery packs. These are often competing considerations in the design of a particular battery pack and/or a particular powered device that receives and is powered by the battery pack. A further competing consideration is the constant desire to provide battery packs, and devices powered thereby, at a lower cost without degrading the experience of the consumer in using the battery pack together with its powered device (or devices).

Much attention has been given to the design of removable battery packs for certain categories of consumer products. For example, the art is crowded with many removable battery pack designs and configurations for power tools (e.g., cordless drills and saws). Similarly, much attention has been given to removable battery packs for more sophisticated electronic devices, such as computers, portable DVD players and the like. However, relatively little attention has been paid to the removable battery packs for other types of more common consumer devices, such as suction force cleaners having a suction motor and impeller or fan assembly commonly referred to as vacuum cleaners. For Instead, for example, latching mechanisms for these other types of consumer devices seem to have been more of an afterthought. Often, for these devices, little attention is given to designing a battery pack latching mechanism that provides proper securing of the battery pack to the consumer device it is to power, while ensuring that the battery pack is easily attached and detached from its consumer device.

SUMMARY

According to one aspect of the present disclosure, a removable battery package or pack is provided. More particularly, in accordance with this aspect, the removable battery pack includes a housing and one or more batteries disposed within the housing and electrically connected to an electrical connector. A user contact is movably mounted in the housing for movable cooperation with the rod. Suitably a lever can be pivotally mounted to the housing or a push button or twist lever can be movably mounted to the housing. A rod such as a push rod is movably mounted to the housing. The push rod is adapted to be axially moved by the user contact. An engagement member such as a latch is movably mounted to the housing. The member is adapted to be moved between a latched position and an unlatched position by the push rod, when the push rod is axially moved by the lever or push button or twisted axially by a twist lever. If desired, the latch can be urged by a biasing element toward the latched position and can require axial movement by the push rod to force the latch toward the unlatched position, overcoming the urging of the biasing mechanism.

In one configuration, axial movement of the push rod can occur along a first axis and movement of the latch between the latched position and the unlatched position can occur along a second axis. In one embodiment, the second axis can be oriented approximately normal relative to the first axis. If desired, a tapered engagement can be provided between the push rod and the latch to translate movement of the push rod along the first axis to movement of the latch along the second axis.

In one embodiment, the push rod can be movable between a first or retracted position and a second or protruding position. Movement of the push rod from the first retracted position to the second protruding position can move the latch from the latched position to the unlatched position. In the second protruding position, the push rod can extend from the housing for ejecting the housing from an associated device in which the housing is received for powering thereof. If desired, the push rod can be urged toward the first retracted position by a biasing element. Also, if desired, the associated device from which the push rod can eject the housing can be a vacuum cleaner and the one of more batteries contained in the housing can be used to power the vacuum cleaner.

In any of the foregoing configurations or a separate configuration, a distal end of the lever relative to a pivotal connection of the lever to the housing can be pulled to drive the push rod axially downward to move the latch from the latched position inward into the housing to the unlatched position.

According to another aspect of the disclosure, a vacuum cleaner having a removable battery pack is provided. More particularly, in accordance with this aspect, the vacuum cleaner includes a housing having a suction inlet. A suction source is disposed within the vacuum cleaner housing for creating a suction source at the suction inlet. A battery pack housing is removably mounted within the vacuum cleaner housing. One or more batteries are disposed within the battery pack housing for powering the suction source. A latching mechanism includes a lever pivotally mounted to the battery pack housing, a push rod movably mounted to the battery pack housing so as to be axially movable by the lever, and a latch urged to a latched position wherein the latch locks the battery pack to the vacuum cleaner housing. An engagement between the push rod and the latch causes the latch to move to an unlatched position from the latched position when the push rod is sufficiently axially moved by the lever.

In one configuration, a full stroke of the lever can cause the push rod to move the latch to the unlatched position and to protrude from the battery pack housing to eject the battery pack housing from the vacuum cleaner housing.

According to still another aspect of the disclosure, a removable battery pack for a powered device is provided. More particularly, in accordance with this aspect, the removable battery pack includes a battery pack housing removably mounted within the powered device for providing power thereto. A latching mechanism includes a lever pivotally mounted to the battery pack housing. A push rod is movably mounted to the battery pack housing so as to be axially movable from a first position to a second position upon stroking of the lever. A latch locks the battery pack within the powered device when in a latched position. The latch is movable from the latched position to an unlatched position allowing the battery pack housing to be removed from the powered device upon the push rod being moved axially from the first position to the second position.

In one configuration, the push rod, when in the second position, can protrude from the battery pack housing. In this configuration, movement of the push rod from the first position to the second position helps to eject the battery pack from the powered device.

According to still yet another aspect of the instant disclosure, a method for removing a battery pack from a powered device is provided. More particularly, in accordance with this aspect, a lever that is pivotally mounted on the battery pack is pulled or stroked. A push rod that is slidably disposed on the battery pack is axially advanced. Due to a mechanical linkage between the lever and the push rod, pulling of the lever causes axial advancement of the push rod. A latch that is slidably disposed on the battery pack is retracted to release the battery pack from the powered device. Specifically, due to a mechanical arrangement between the latch and the push rod, advancing of the push rod causes retraction of the latch. In one configuration, an ejection of the battery pack from the powered device is assisted by the push rod protruding from the battery pack upon axial advancement thereof.

BRIEF DESCRIPTION OF THE DRAWINGS

FIG. 3A is a perspective view of a vacuum cleaner having a receptacle for receipt of the battery pack.

FIG. 3B is a front view of a vacuum cleaner having a battery pack removably disposed in the receptacle for powering the vacuum cleaner.

FIG. 4 is a side elevation schematic view of the battery pack.

FIG. 5 is an end elevation schematic view of the battery pack.

FIG. 6 is an enlarged partial cross-section view of the battery pack shown in FIG. 5 showing an interface between a spring-biased push rod and a spring-biased latch.

DETAILED DESCRIPTION

In the description unless otherwise indicated, all numbers expressing quantities of dimensions, physical characteristics, and so forth used in the specification and claims are to be understood as being modified in all instances by the term "about". Accordingly, unless indicated to the contrary, the numerical values set forth in the following specification and claims may vary depending upon the desired properties sought to be obtained in the present disclosure. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all sub-ranges subsumed therein. For example, a stated range of "1 to 10" should be considered to include any and all sub-ranges-between (and inclusive of) the minimum value of 1 and the maximum value of 10; that is, all sub-ranges beginning with a minimum value of 1 or more and ending with a maximum value of 10 or less, e.g., 5.5 to 10. Also as used herein, spatial or directional terms in regards to the position such as "left", "right", "inner", "outer", "above", "below", "top", "bottom" "over", "on", "side", "front", "back" and the like have their standard dictionary meanings.

Figure 1A:
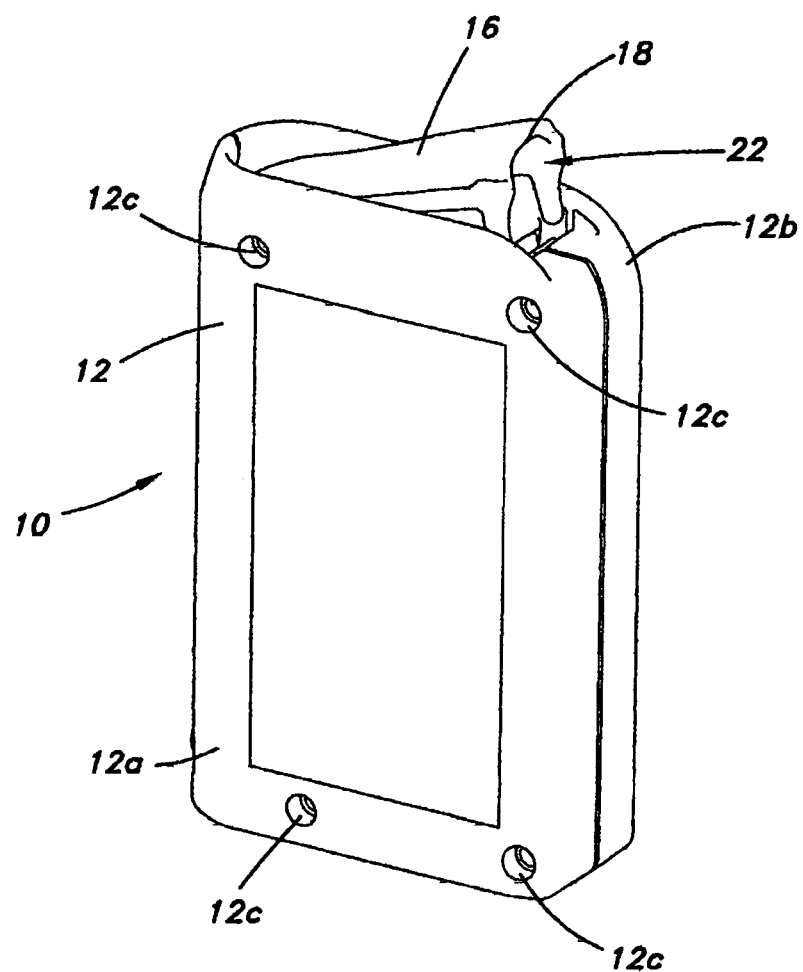
FIG. 1A is a perspective view of a removable battery pack having a release lever, the release lever shown in an actuated or pulled position.
Figure 1B:
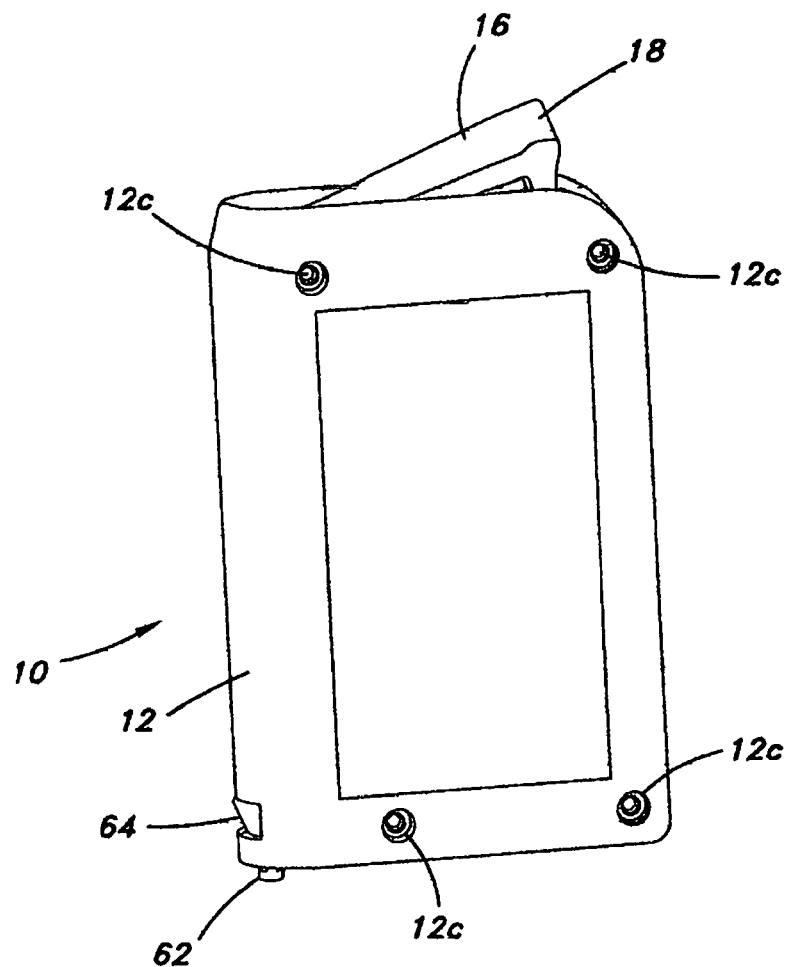
FIG. 1B is another perspective view of the removable battery pack of FIG. 1 showing a latch in a refracted or unlatched position and a push rod in an extended or protruding position.
Figure 8A:
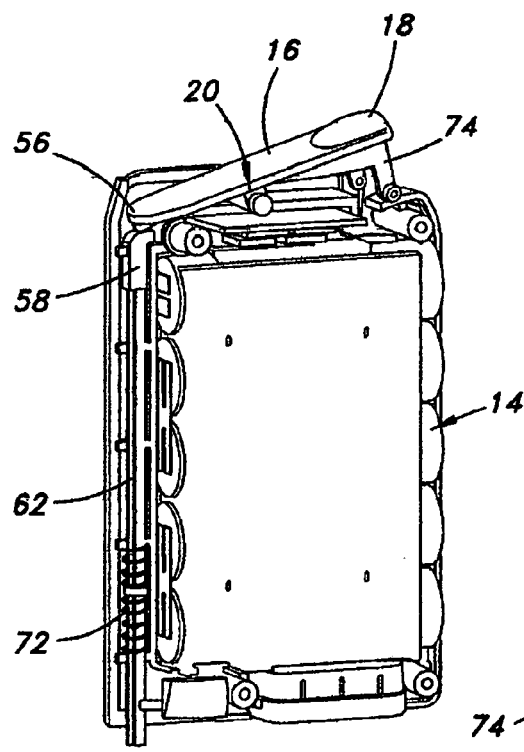
FIG. 8A is a perspective view of the battery pack shown with a first cover removed to illustrate the longitudinal extent of the push rod and the batteries carried within the battery pack.
Figure 8B:
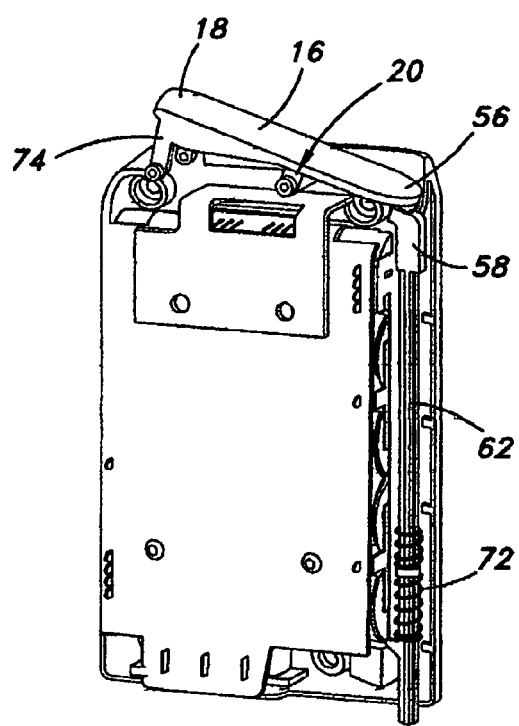
FIG. 8B is another perspective view of the battery pack shown with a second, opposite cover removed, the first and second covers together forming a housing of the battery pack.
Figure 9A:
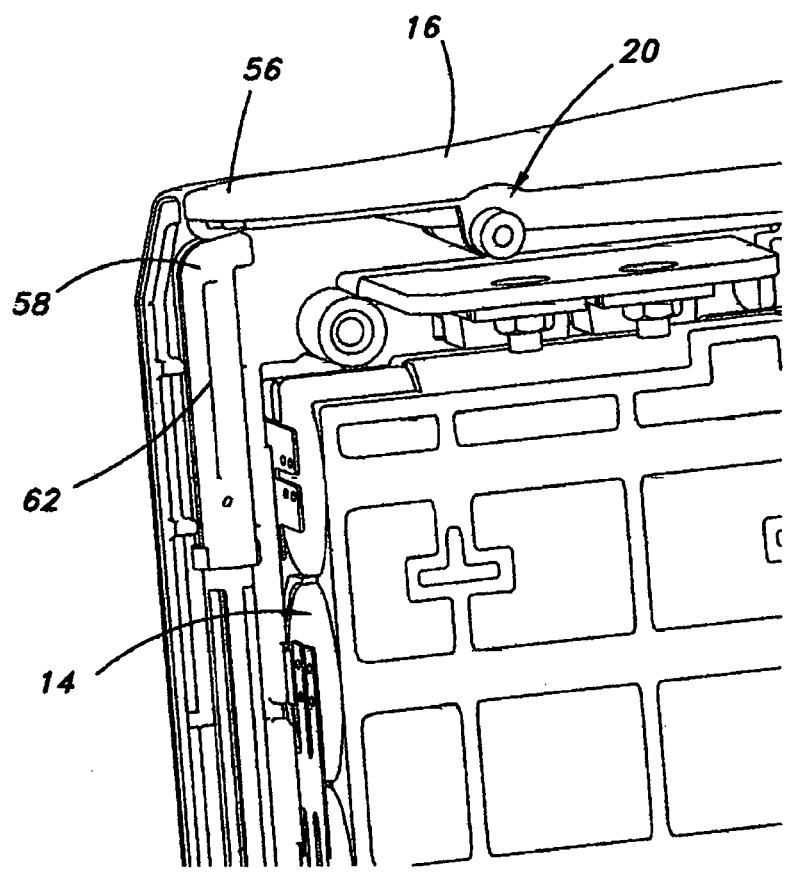
FIG. 9A is an enlarged partial perspective view of the battery pack shown with the first cover removed to illustrate the lever in a normal resting position and the push rod in the retracted position.
Figure 9B:
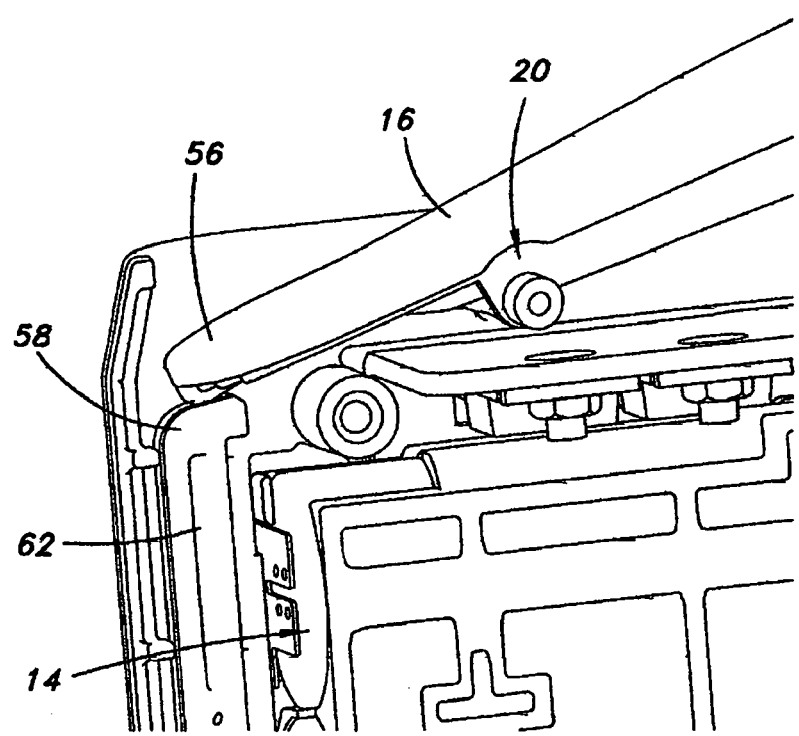
FIG. 9B is another partial perspective view of the battery pack shown with the first cover removed to illustrate the lever in the pulled position, which causes the push rod to be in the protruding position.

Referring now to the drawings, wherein the showings are for purposes of illustrating one or more exemplary embodiments of the present disclosure, FIGS. 1A and 1B show a removable battery pack 10 for a powered device. The battery pack 10 includes a housing 12 and one or more batteries 14 (FIG. 8A) disposed within the housing 12. The housing 12 can be formed of a first shell or member 12a and a second shell or member 12b, with the members 12a,12b held together by suitable fasteners 12c (e.g., screws). As will be understood and appreciated by those skilled in the art upon reading the present disclosure, a lever 16 is pivotally mounted to the housing 12 for enabling removal of the battery pack 10 from a powered device in which it is received for powering thereof.

In particular, as will be described in more detail below, a one end 18 of the lever 16, which is spaced apart relative to a pivotal connection 20 of the lever 16 to the housing 12 (see FIGS. 8A-9B), is pullable to unlatch the battery pack 10 from a powered device in which it is received and/or to eject the battery pack 10 from the device in which it is received. The lever 16 can have a movement angle about the pivot point 20 of from greater than one degree to less than 180 degrees and more suitably from 5 to less than 90 degrees. As illustrated, the end 18 of the lever 16 can be formed as a raised portion adjacent a recess 22, the raised formation of the end 18 and the recess 22 appropriately sized to receive a user's finger for pivotal lifting of the lever 16, particularly lifting of the end 18 thereof.

Figure 2:
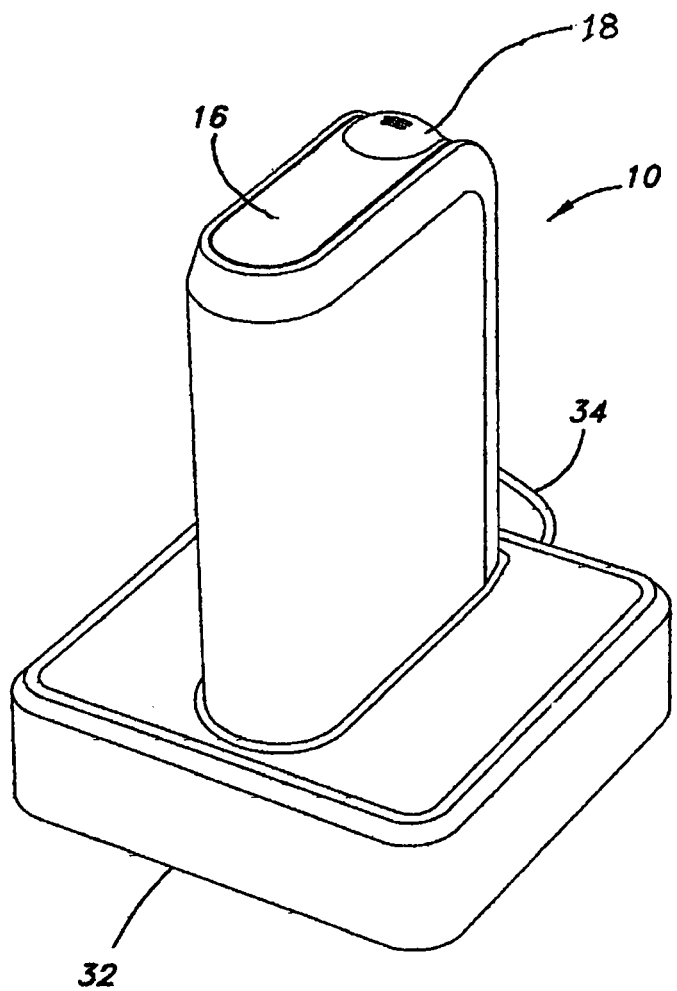
FIG. 2 is a perspective view of the removable battery pack seated on a recharging base.
Figure 7A:
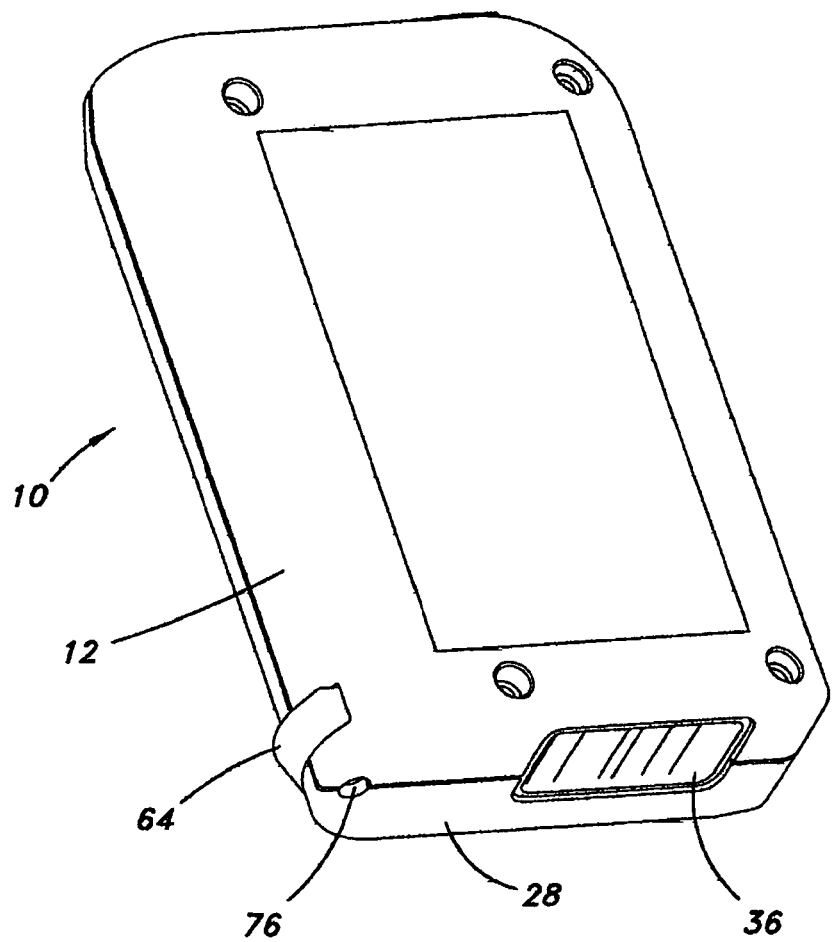
FIG. 7A is an underside perspective view of the removable battery pack showing the latch in a locking or latched position and the push rod in a retracted position.
Figure 7B:
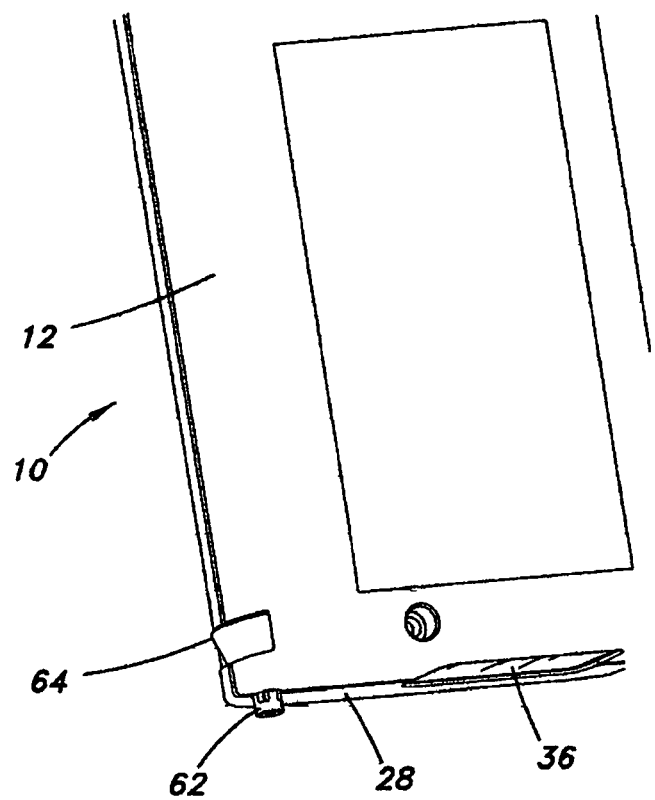
FIG. 7B is partial underside perspective view of the removable battery pack showing the latch in the retracted position and the push rod in the protruding position.

As is known and understood by those skilled in the art, the battery pack 10 can include appropriate positive and negative terminal connections for electrically connecting the battery pack 10, and specifically the one or more batteries 14 thereof, to suitable electrical components of a powered device. In one arrangement, as illustrated in FIGS. 4 and 5, the electrical connections 24, 26 can extend from a bottom side 28 of the battery pack housing 12 and be provided adjacent a supporting structure 30 of the housing 12 for providing structural protection to the terminal connections 24, 26. Alternatively, as shown in FIGS. 7A and 7B, the terminal electrical connections can be provided through an interface 36 that is slightly recessed within the housing 12 and thereby structurally protected or supported. With reference to FIG. 2, the removable battery pack 10 can be received on a charging base 32 for recharging of the one or more batteries 14 of the battery pack 10. The recharging base 32 can be constructed as is well known by those of skill in the art so as to receive electrical power through a conventional power cord 34 and convert the same into appropriate DC power to be received and stored by the one or more batteries 14 for subsequent powering of a powered device.

Figure 10:
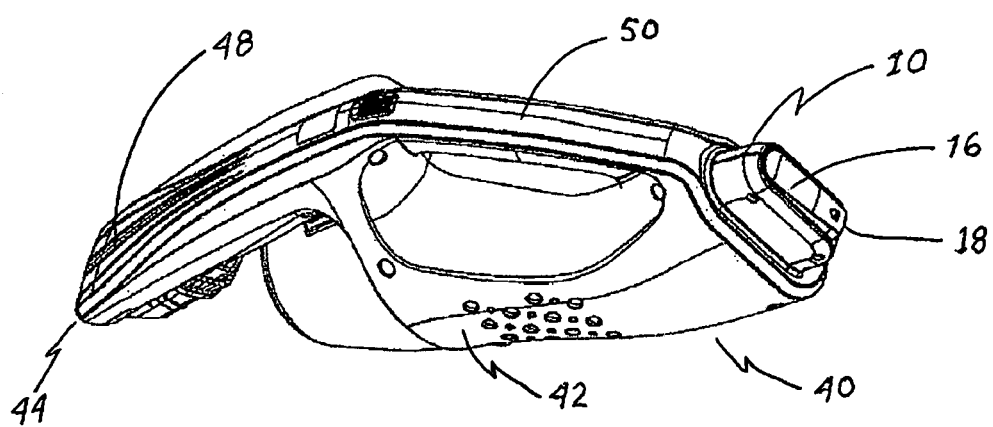
FIG. 10 is a perspective view of a hand held portable suction cleaner with the removable battery in the battery receiving opening and well.
Figure 11:
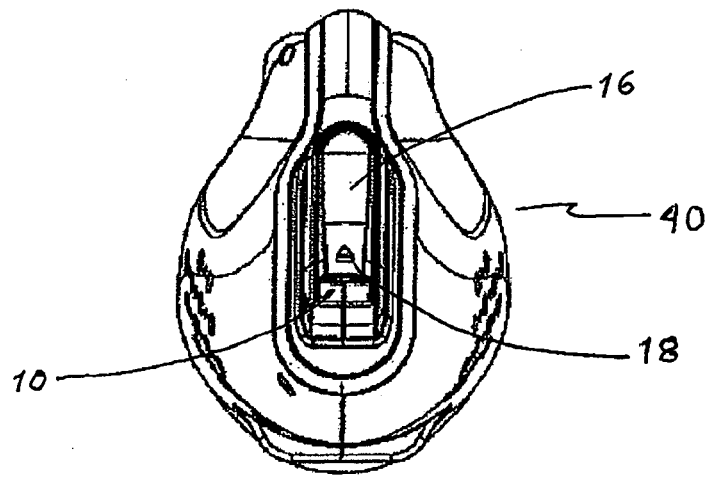
FIG. 11 is a rear view of the hand held portable suction cleaner of FIG. 10 with the removable battery in the battery receiving opening and well.

The removable battery pack 10 can be used with a variety of powering devices configured to receive the battery pack 10 and receive power therefrom. For example, with reference to FIGS. 3A, 3B, 10 and 11, the battery pack 10 can be used in association with a powered device, such as an electrically powered cleaning device such as a vacuum cleaner 40. As is conventional, the vacuum cleaner 40 includes a vacuum cleaner housing 42 having a suction inlet 44. A suction source (not shown) is disposed within the vacuum cleaner housing 42 for creating a vacuum at the suction inlet 44, as is known and understood by those skilled in the art. The vacuum cleaner 40 of the illustrated embodiment of FIGS. 3A and 3B for a stick-type vacuum cleaner wherein the housing 42 includes a nozzle base portion 48 disposed at a lower end, pivotally connected to an elongated handle portion 50. The nozzle portion 48 includes the suction inlet 44 defined therein and the handle portion 50 can house the motor/fan assembly forming the suction source. For a hand held vacuum cleaner as shown in FIGS. 10 and 11 the handle 50 is integrated into the unit but the nozzle 48 with nozzle inlet 44, suction fan assembly and removable battery 10 can be arranged in the body or housing 42.

The battery pack 10 can be removably mounted to or within the vacuum cleaner 40. In other words the battery pack 10 can be mounted either in the nozzle base 48 or in the handle portion 50. The mounting in FIG. 3A can be in the opening and well 52 as shown in FIG. 3B. The one or more batteries 14 disposed within the battery pack housing 12 can be used for powering the suction source of the vacuum cleaner 40. When the one or more batteries 14 have lost some or all of their charge, the battery pack 10 can be removed from the vacuum cleaner 40 and mounted on the recharging base 32 for recharging of the one or more batteries 14.

With reference now to FIGS. 4-9B, the battery pack 10 can include a latching mechanism comprised of the lever 16 pivotally mounted to the battery pack housing 12, a push rod 62 movably mounted to the battery pack housing 12 and a latch 64 movably mounted to the battery pack housing 12. As will be described in more detail below, the push rod 62 is adapted to be axially moved by the lever 16 and the latch 64 is adapted to be moved radially from a latched position to an unlatched position by the push rod 62 when the push rod is axially moved by the lever 16. In the latched position, the latch 64 can lock the battery pack 10 within its power device (e.g., vacuum cleaner 40).

The latch 64 is movable from its latched position (FIG. 9A) to its unlatched position (FIG. 9B) allowing the battery pack housing 12 to be removed from its powered device, when the push rod 62 is moved axially from a first position to a second position. In particular, the push rod 62 is movable from its first position to its second position upon stroking of the lever 16 (i.e., fully lifting the end 18 of the lever 16.) With specific reference to FIGS. 9A and 9B, lifting end 18 of the lever 16 causes the lever 16 to pivot about pivotal connection 20. This, in turn, causes lever end 56 to point downwardly, contacting the upper end 58 of the push rod 62 and thereby driving the push rod axially downwardly. In one embodiment (FIGS. 8A,8B) the lever 16 can include legs 74 depending from the end 18. The legs 74 cooperate with the housing 12 to limit the stroke of the lever 16.

As best shown in FIG. 6, the latch 64 can be urged to its latched position wherein the latch 64 locks the battery pack 10 within its power device (e.g., to the vacuum cleaner 40 or vacuum cleaner housing 42). Specifically, the latch 64 is urged by a biasing element, such as spring 66, toward the latched position. Axial movement of the push rod 64, however, can force the latch 64 toward its unlatched position by overcoming the urging of the biasing element 66. In particular, an engagement between the push rod 62 and the latch 64 can cause the latch 64 to move to the unlatched position (shown in FIG. 7B) from the latched position (shown in FIG. 7A) when the push rod 64 is sufficiently axially moved (i.e., fully stroked) by the lever 16.

As shown in the illustrated embodiments, axial movement of the push rod 62 occurs along a first axis and movement of the latch 64 between the latched position and the unlatched position occurs along a second axis. The second axis can be oriented approximately normal relative to the first axis. As best shown in FIG. 6, the engagement between the push rod 62 and the latch 64 can be a tapered engagement which translates movement of the push rod 62 along the first axis to movement of the latch 64 along the second axis. To create this tapered engagement, the push rod 62 can include a tapered portion 68 that engages a cooperating tapered portion 70 of the latch 64 upon axial movement of the push rod 62 to thereby move the latch 64 from its latched position to the unlatched position.

The first position of the push rod 62 (shown in FIGS. 7A and 9A) can be referred to as a retracted position and the second position of the push rod 62 (shown in FIGS. 7B and 9B) can be referred to as a protruding position. Thus, the push rod 62 is movable between a first retracted position and a second protruding position. In the first retracted position, the push rod 62 is retracted within the housing 12 (i.e., it does protrude from the housing 12). In the second protruding position, the push rod 62 extends from the battery pack housing 12 through aperture 76 defined in the underside 28 of the housing 12 for ejecting the housing 12 from an associated device in which the housing is received for powering thereof. Also, as already mentioned, movement of the push rod 62 from the first retracted position to the second protruding position moves the latch 64 from the latched position to the unlatched position.

The push rod 62 can be urged toward its first retracted position by a biasing element, such as the illustrated spring 72 (only schematically illustrated in FIGS. 4 and 5). Thus, when the end 18 of the lever 16 is pulled, the push rod 62 is driven axially downward to move the latch 64, against the bias of the spring, from its latched position inward into the housing 12 to its unlatched position. More specifically, a full stroke of the lever 16 causes the push rod 62 to move the latch 64 to the unlatched position and further causes the push rod 62 to protrude from the battery pack housing 12, which can be used to assist in the ejection of the battery pack housing 12 from the housing of the powered device in which the battery pack is received (e.g., vacuum cleaner housing 42).

By the foregoing arrangement, a method for removing a battery pack from a powered device can be described. First, the lever 16 that is pivotally mounted on the battery pack 10 can be pulled. Pulling up one end of the lever 16 causes the other end to push down on the push rod 62, causing it to axially advance. Such axial advancement occurs as a result of the push rod 62 being slidably disposed on the battery pack 10 and mechanically arranged such that a rotating movement of the lever 16 is translated into axial movement of the push rod 62. The advancing of the push rod 62, as already described, causes the latch 64 to retract. Refraction of the latch 64 results from the latch being slidably disposed on the battery pack 10 and the tapered engagement between the push rod 62 and the latch 64. In the unlatched position, the latch 64 allows the battery pack 10 to be removed from its powered device. The battery pack 10 can also be ejected from its powered device via the push rod 62 protruding from the battery pack 10 upon axial advancement thereof.

Although in the illustrated embodiment, only a single latch 64 is illustrated, it will be appreciated by those with skill in the art that any number of latches 64 can be provided along the push rod 62 and within the housing 12 of the battery pack such that axial movement of the push rod 62 could slidably move any number of latches from respective latched positions to unlatched positions upon sufficient axial movement of the push rod. Also, it should be appreciated that installation of the battery pack 10 into a powered device can operate to force the one or more latches (e.g., latch 64) inward against their respective biasing elements allowing the battery pack to be removably secured to a powered device. The configuration of the device and/or the latches can then allow the latches to be returned to their latched positions by the biasing mechanism when the battery pack is fully installed.

It will be appreciated that various of the above-disclosed and other features and functions, or alternatives thereof, may be desirably combined into many other different systems or applications. Also it is to be appreciated that various presently unforeseen or unanticipated alternatives, modifications, variations or improvements therein may be subsequently made by those skilled in the art which are also intended to be encompassed by the present disclosure as recited in the claims and the equivalents thereof.

What is claimed is:

1. A battery pack configured to supply power to a cleaning system and be received by a battery receptacle of the cleaning system, the battery pack comprising:

a housing having an aperture, the housing configured to be received in the battery receptacle;

a battery cell within the housing;

an electrical contact configured to electrically connect the battery cell to the cleaning system;

a user contact including a lever pivotably mounted to the housing, the user contact movable relative to the housing from a first position to a second position;

a moveable member that interfaces with the user contact such that movement of the user contact from the first position to the second position moves the movable member from a retracted position to an extended position;

an engagement member that interfaces with the moveable member such that movement of the movable member from the retracted position toward the extended position moves the engagement member from a latched position toward an unlatched position, wherein in the latched position, the engagement member extends from the housing and is configured to engage the battery receptacle to secure the battery pack to the cleaning system, wherein in the unlatched position, the engagement member is at least partially retracted into the housing and the battery pack is removable from the battery receptacle, and wherein in the extended position, the movable member extends through the aperture of the housing to eject the battery pack from the housing.

2. The battery pack of claim 1, wherein the movable member does not extend through the aperture of the housing until the engagement member has moved to the unlatched position.

3. The battery pack of claim 2, wherein the engagement member is fully retracted into the housing in the unlatched position.

4. The battery pack of claim 1, wherein the engagement member is fully retracted into the housing in the unlatched position.

5. The battery pack of claim 1, wherein the housing includes a first side and a second side opposite the first side, wherein the user contact is located on a first side of the housing and the aperture extends through the second side of the housing.

6. The battery pack of claim 5, wherein the housing includes a third side that extends from the first side to the second side, wherein the moveable member extends along the third side of the housing.

7. The battery pack of claim 1, wherein the moveable member has a tapered engagement section to translate movement of the moveable member along a first axis to movement of the engagement member along a second axis.

8. The battery pack of claim 7, wherein the first axis is substantially normal to the second axis.

9. The battery pack of claim 1, further comprising a biasing member that biases the moveable member toward the retracted position.

10. The battery pack of claim 1, wherein the lever includes a first end, a second end, and a pivot point between the first and second ends that pivotally couples the lever to the housing, and wherein the second end of the lever contacts the moveable member to move the movable member to the extended position in response to movement of the user contact from the first position to the second position.

11. The battery pack of claim 1, wherein the engagement member includes a latch.

12. The battery pack of claim 1, wherein the moveable member includes a push rod.

13. The battery pack of claim 1, wherein the user contact includes a lever.

14. A battery pack configured to supply power to a cleaning system and be received by a battery receptacle of the cleaning system, the battery pack comprising:
   a housing including an aperture;
   a user contact moveable in a first direction away from the housing, the user contact moveable between a first position and a second position;
   a moveable member that moves from a retracted position to a protruded position when the user contact moves from the first position toward the second position;
   an engagement member that moves from a latched position to an unlatched position when the moveable member moves from the retracted position toward the protruded position; and
   wherein a portion of the moveable member extends through the aperture of the housing in a second direction, opposite the first direction, when the moveable member is in the protruded position to eject the battery pack from the battery receptacle,
   wherein the engagement member includes a latch, wherein the moveable member includes a push rod, and wherein the user contact includes a lever.

15. The battery pack of claim 14, wherein the user contact is located on a first side of the housing and the engagement member is located on a second side of the housing, the second side opposite the first side.

16. The battery pack of claim 14, wherein the moveable member has a tapered engagement section to translate movement of the moveable member along a first axis to movement of the engagement member along a second axis that is substantially normal to the first axis.

17. The battery pack of claim 14, further comprising a biasing member that biases the engagement member toward the latched position.

18. The battery pack of claim 14, wherein the portion of the moveable member does not extend through the aperture of the housing until the engagement member moves to the unlatched position.

* * * * *